United States Patent Office 2,888,361
Patented May 26, 1959

2,888,361

PROCESS OF COATING CATHODE RAY TUBE SCREENS

William J. Curry, Kearny, N.J., assignor to International Telephone and Telegraph Corporation, New York, N.Y., a corporation of Maryland No Drawing. Application December 27, 1954
Serial No. 477,929

9 Claims. (Cl. 117—33.5)

This invention relates to the process of coating cathode ray tube screens preparatory to applying a metal backing thereto.

In the manufacture of cathode ray tubes, the use of metalized screens, that is the application of a metal backing to the phosphor screen, has become widespread. Aluminum has been the principal metal employed and such screens are usually referred to as "aluminized" screens. In the manufacture of such metalized screens it has been customary to first apply a layer of phosphors to the inside of the glass tube face which, after being dried as by heating, has applied thereon a barrier layer or film upon which in turn there is precipitated, usually by evaporation, a layer of aluminum. The barrier layer or film is required for several reasons. Among these is the fact that the phosphor is full of crevices and holes and if the metal were directly applied thereto it would be very uneven and instead of reflecting the light, would diffuse and diffract it. It is desired that the final metal film should be similar to a mirror in smoothness and rest on the high points of the irregular surface of the phosphor. This is accomplished by providing the thin film barrier layer on the phosphor screen before application of the evaporated metal. Several techniques have been used for forming this film, such as applying water and freezing it so as to produce a smooth surface and then applying over the smooth surface a film forming material which is usually organic. The water is removed after the film has been set. Another technique is to cover the phosphor with a shallow level of water and apply an organic solution in drops. Usually nitrocellulose in a butylalcohol-ether solution is employed and spreads naturally to form a film on the water. The water is then slowly removed from the film by a tipping operation so that the film settles on the surface of the phosphor screen. Both of the methods just described involve considerable difficulty. Particularly in the first-mentioned process the freezing of the water in the bulb and the removal of the water thereafter introduces many problems. In the second method great care must be used in floating the material on the water to form the film, and then removing the water without disturbing the film.

An object of the present invention is the provision of an improved method for metalizing a cathode ray tube screen and particularly for forming the barrier layer.

In accordance with a major aspect of the present invention the compounds used in forming the barrier or boundary layer are water soluble. Various water soluble oxypolymers particularly cellulose and polyvinyl compounds, have been found to be especially suitable for this purpose. Cellulose compounds such as sodium carboxymethyl cellulose and methyl cellulose have proven satisfactory. Polyvinyls, such as polyvinyl alcohol and polyvinyl acetate have given excellent results. These compounds can be used separately or combined in various portions, and also with the addition of a water soluble plasticizer such as glycerin, or polymethacrylic acid. These are then dissolved in water. The thickness of the film produced is controlled by controlling the concentration and viscosity of the solution. The solution is poured into a bulb containing an air-dried screen so as to avoid splashing or turbulence, is kept there for a period of time such as for example 5 minutes, and then slowly drained off, the part remaining on the screen being then dried thereby producing a film ready for aluminizing.

In greater detail a preferred example of the technique for coating the phosphor screen in accordance with the present invention is as follows. The bulb or glass tube containing an air-dried screen is placed on a tilt table and the table is tilted from a normal position to an angle of approximately 60 to 70 degrees. A mixture or solution of a suitable compound or compounds dissolved in water is prepared as described below.

This mixture or solution is slowly poured into the bulb in such a manner as not to cause splashing or turbulence. The quantity of mixture used is preferably that which will cover all parts of the screen to a depth of ¼ inch when the bulb is tilted back to the normal position in which the phosphor is substantially horizontal. After the mixture has been poured the bulb is tilted back to the normal position and held there for 5 minutes. The bulb is then tilted so as to slowly pour off the mixture, the tilting being at an angle such that it takes from 10 to 12 minutes to pour off the excess mixture. The poured-off mixture is caught and may be used again. The remainder of the mixture that is on the screen is dried thereby producing a film which is ready for the application of an evaporated metal, such as for example aluminum. The film thus produced is smooth, tough, compatible with the phosphor screen and suitable for metalizing.

Various mixtures of water soluble organic compounds have proven satisfactory. Four examples are as follows:

(1) Methyl cellulose and polyvinyl alcohol and distilled water.

(2) Sodium carboxymethyl cellulose and polyvinyl alcohol and distilled water.

(3) Polyvinyl alcohol and distilled water.

(4) Polyvinyl acetate and distilled water.

The first mixture is prepared as follows: 300 grams of methyl cellulose is mixed with one liter of distilled water, 300 grams of polyvinyl alcohol is mixed with one liter of distilled water and these two solutions are poured together. The thickness of the film is controlled by adjusting the weight of the cellulose and alcohol over a narrow range of 280 to 340 grams per liter of water. The most satisfactory solution was found to be 300 grams per liter for the alcohol and the cellulose.

Solution No. 2 is prepared in the same way as No. 1: 300 grams sodium carboxymethyl cellulose mixed with a liter of distilled water and 300 grams of polyvinyl alcohol in one liter of distilled water and the two solutions are mixed together. The viscosity is adjusted by varying the weights of the cellulose and alcohol over a range of 200 to 400 grams per liter. The most desirable weight for the particle size of the screen used in one example was found to be 300 grams of the cellulose and 300 grams of the alcohol per liter.

The third mixture is made by dissolving 300 grams of polyvinyl alcohol in a liter of distilled water and this gave slightly better results than the mixture of the cellulose and alcohol. Again, the viscosity of the solution is adjusted by varying the weight of the polyvinyl alcohol.

The fourth solution is prepared by mixing 300 grams of polyvinyl acetate in a liter of distilled water and the viscosity is adjusted.

With loose control of the temperature and humidity of the atmosphere in the room where the coating operation is performed; it is necessary to make adjustments in the composition of the four mixtures for each set of humidity and temperature conditions. The composition of the solution also influence the burn-off time required for the coated screens and should be adjusted to obtain the desired time. In general, solutions No. 3 and 4 are found to be superior; however, all four solutions, or variations thereof, could be satisfactorily used in coating screens on a production basis after adjustments in the compositions are made to adapt the process for a particular condition encountered in any locality.

While I have described above the principles of my invention in connection with specific examples thereof, it is to be clearly understood that this description is made only by way of illustration and not as a limitation to the scope of my invention as set forth in the objects thereof and in the accompanying claims.

What is claimed is:

1. The process of preparing a covering film on a dried phosphor screen prior to forming a metal backing on the screen comprising the steps of pouring aqueous solution of a film-forming oxypolymer compound onto the phosphorus screen to cover it, allowing the solution to soak into the screen, pouring off at least some of the excess solution so as to leave a residuum which wets the screen, and drying the screen to produce a smooth covering film thereon.

2. The process according to claim 1, in which said oxypolymer is a cellulose compound.

3. The process according to claim 1 in which said oxypolymer is a polyvinyl compound.

4. The process according to claim 1 wherein said oxypolymer compound is methyl cellulose.

5. The process according to claim 1 in which said oxypolymer compound is a sodium carboxymethyl cellulose compound.

6. The process according to claim 1 in which said oxypolymer is a polyvinyl alcohol compound.

7. The process according to claim 1 in which said oxypolymer compound is a polyvinyl acetate.

8. The process according to claim 1 further comprising the steps of preparing said solution by mixing methyl cellulose and polyvinyl alcohol in water.

9. The process according to claim 1 further comprising the step of preparing said solution by mixing sodium carboxymethyl cellulose and polyvinyl alcohol in water.

References Cited in the file of this patent

UNITED STATES PATENTS

| | | |
|---|---|---|
| 2,554,257 | Longini et al. | May 22, 1951 |
| 2,676,894 | Anderson | Apr. 27, 1954 |
| 2,710,262 | Larch | June 7, 1955 |
| 2,726,966 | Thomson | Dec. 13, 1955 |
| 2,749,252 | Groner | June 5, 1956 |
| 2,756,167 | Barnett | July 24, 1956 |
| 2,792,315 | Levy | May 14, 1957 |